Sept. 11, 1956 A. H. B. WALKER 2,762,965

VOLTAGE REGULATING APPARATUS OF THE ELECTRONIC TYPE

Filed March 17, 1953

INVENTOR
ALEC HERVEY BENNETT WALKER,

BY Robert B Larson
ATTORNEY

United States Patent Office 2,762,965

Patented Sept. 11, 1956

2,762,965

VOLTAGE REGULATING APPARATUS OF THE ELECTRONIC TYPE

Alec H. B. Walker, King's Cross, London, England, assignor to Westinghouse Brake and Signal Company Limited, London, England Application March 17, 1953, Serial No. 342,848

Claims priority, application Great Britain April 7, 1952

1 Claim. (Cl. 323—22)

This invention relates to voltage regulating apparatus for maintaining substantially constant, at predetermined value, the voltage applied to a circuit to be regulated, the regulating action being controlled by an electronic amplifier the potential applied to the control grid of this amplifier being dependent upon the voltage of the circuit to be regulated and the anode or output current of the amplifier being arranged to effect or to control the action of voltage adjusting arrangements for the regulated circuit.

Apparatus of this kind suffers from the disadvantage that, owing to the unavoidable time constants inherent in the voltage adjusting arrangements, the apparatus tends to over-correct, or hunt, and it is an object of this invention to prevent or reduce this hunting by providing, in the amplifier, an over-riding time delay in the response of the amplifier to variations in control grid potential.

According to the invention, the voltage regulating apparatus comprises an amplifier having at least one stage of amplification comprising a thermionic valve having a control grid, an error signal proportional to variations from a predetermined value of the voltage to be regulated being supplied to the input of the amplifier, the output of which is fed to apparatus for adjusting the voltage to be regulated, in which the thermionic valve is provided with differential negative feed back to the control grid, whereby the response of the valve to variations in the error signal is retarded, for the purpose of reducing the hunting of the apparatus.

If care is not taken over the choice of valve and other circuit components, it may be found that the time delay introduced into the amplifier circuits renders the apparatus too insensitive and sluggish, and the characteristics of the valve and the circuit constants are preferably so chosen that its range of amplification is limited to a relatively narrow band of difference between the voltage of the circuit to be regulated and the desired value so that any such difference beyond the limits of this range will cause the electronic amplifier to be driven towards its saturation or cut-off condition in which the voltage regulating arrangements continuously operate to adjust the voltage applied to the circuit to be regulated.

As a result of the response of the apparatus to circuit voltage changes will, for departures of this voltage from the predetermined values within the range or band above referred to, be relatively slow, being dependent upon the effective time constant due to the differential feedback, while for circuit voltage departures outside this range or band the response will be relatively rapid being delayed only by the residual inherent delay in the voltage adjusting arrangements. Transient voltage errors within the range or band will thus only effect a regulating action if they are of longer duration than the time constant above referred to which is dependent upon the valve amplification.

The sluggishness of response of the apparatus to small voltage errors which are corrected by regulation of the circuit voltage within the range or band is evidently without disadvantage and on the other hand renders the action of the apparatus stable while its action as regards the eventual correction of such an error which is continued or persistent will be proportional to the magnitude of the error.

The invention is illustrated, by way of example, in the accompanying drawing of which:

Figure 1:
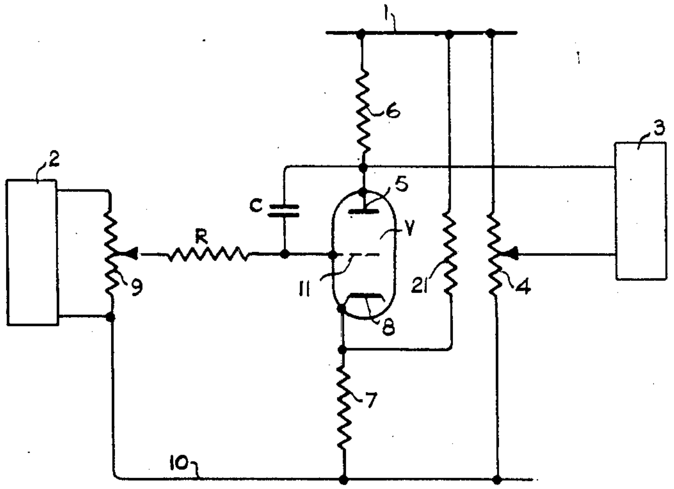
Figure 1 shows voltage regulating apparatus comprising a single thermionic valve amplifier embodying the invention.

Referring now to Figure 1, the voltage regulating apparatus includes an amplifier comprising a thermionic valve V having an anode 5, a control grid 11 and a cathode 8. Positive and negative high tension lines 1 and 10 respectively are connected to a direct current source of substantially constant voltage (not shown). Anode 5 is connected to the positive high tension line 1, through an anode resistance 6 and the cathode 8 is connected through a cathode resistor 7 to the negative high tension line 10. The output from the amplifier is supplied to apparatus 3, which may include one or more further stages of amplification, for adjusting the voltage to be regulated. This apparatus 3, may, for example, comprise a saturable reactor connected in well known manner in the alternating current supply circuit to a rectifier the output voltage of which is to be regulated, the control winding of the saturable reactor being fed, preferably through a further stage or stages of amplification from the output of the amplifier.

The input to the amplifier is provided by any suitable form of discriminator, indicated by the reference numeral 2, which produces across the potentiometer 9 an error signal in the form of a potential which is proportional to the variations from a predetermined value, of the voltage to be regulated. The negative end of the potentiometer 9 is connected to the cathode resistor 7, whilst an adjustable tapping is connected through a series connected resistor R to the control grid 11 of the valve. In this manner the error signal produced by the discriminator 2 is applied to the control grid 11. A potentiometer 4 is connected across the high tension lines 1, 10 and the output of the amplifier is taken from a tapping on this potentiometer and the anode 5 and fed to the voltage adjusting apparatus 3. A condenser C connects the anode 5 to the control grid 11 and a resistor 21 is connected between the cathode 8 and the positive high tension line 1 in order to provide, in conjunction with the cathode resistor 7, a fixed positive bias to the cathode 8 in the absence of any anode current.

Figure 2:
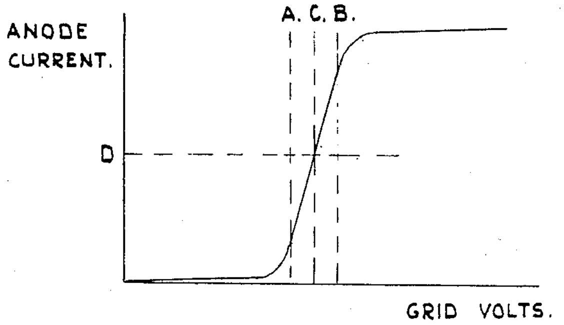
Figure 2 is a diagram to illustrate the working characteristics of the valve shown in Figure 1.

In Figure 2 is illustrated the working characteristic of the valve V, anode current being plotted against grid voltage, the one being a measure of the output of the amplifier and the other of the magnitude of the error signal. The scale of this curve has been much distorted in order to clarify the description of the operation of this apparatus. Vertical lines A and B represent the limits of grid potential between which the valve operates effectively as an amplifier. Potentials less than A or greater than B, when applied to the grid of the valve drive the valve to cut-off or into saturation and thus force it to operate outside its limits of effective amplification in a region wherein further variations of grid potential bring about little or no corresponding variation in anode current, and therefore in output. Between the limiting values A and B, however, variations in input voltage reflected in corresponding variations in grid potential, bring about variations in anode current and others in the output fed to the adjusting apparatus 3, to oppose the change in the voltage to be regulated which brought about these variations. The condenser C and resistor R have the effect of retarding the response of the valve V to variations in grid potential by providing a heavy differential negative feed back to the grid, thus tending to counteract over-correction or hunting.

This delay in response to change in grid potential is dependent upon the amplification of the valve and accordingly occurs only between the limits A and B. If, therefore, the valve is so designed that the limits A and B correspond to the limits of the permissible range of variation in the voltage to be regulated, and any variation of the voltage goes outside those limits, then the valve will respond promptly, without the above mentioned delay, to bring the voltage back within these limits. Variations within those limits will be corrected only after the delay in response but, as the actual value of the voltage within the permissible range of variation is not important, this delay is no disadvantage.

The arrangement is preferably such that, when the voltage to be regulated is at the desired value the grid potential has a value C (Figure 2), situated centrally in the zone A–B, corresponding to an anode current D. Any variations of the voltage to be regulated from that desired value then causes an increase or a decrease in anode current, and thus in the amplifier output, which causes the adjusting apparatus to adjust the voltage accordingly.

The invention is particularly applicable to regulating apparatus in which the electronic amplifier comprises a twin-triode valve having two anodes and a common cathode and cathode resistor with a separate grid for each anode, a potential which is dependent upon the voltages of the circuit to be regulated being applied to the first grid while the potential applied to the second grid is determined by the anode current controlled by the first grid, the current in the second anode circuit controlling the operation of arrangements for adjusting the voltage to be regulated.

Figure 3:
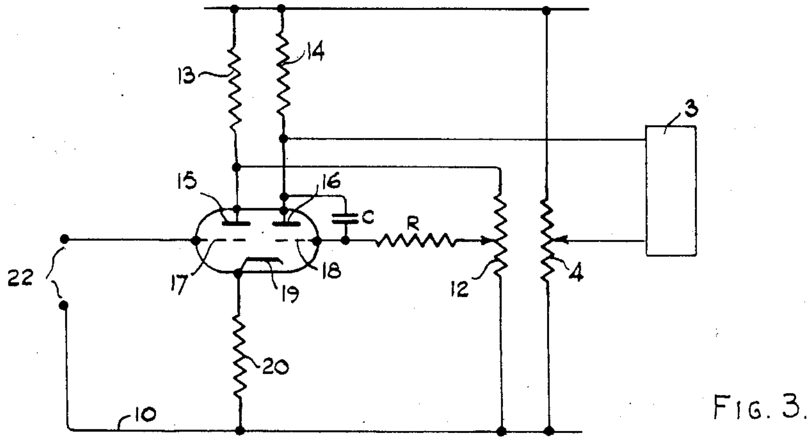
Figure 3 shows the invention applied to an amplifier comprising a double triode valve.

Figure 3 illustrates the application of the invention to apparatus of this kind and shows a double triode valve having a first anode 15, a second anode 16, a first control grid 17, a second control grid 18 and a common cathode 19 and cathode resistor 20. First and second anodes 15 and 16 are connected to the positive high tension line 1 through anode resistances 13 and 14 respectively and the common cathode 19 is connected to the negative high tension line 10 through the cathode resistor 20. First control grid 17 is connected to one of the input terminals 22 across which is applied a voltage dependent upon the voltage to be regulated. A potentiometer 12 is connected between first anode 15 and the negative high tension lead 10. A tapping on potentiometer 12 is connected to the second grid 18 in series with a resistor 11 so that changes in anode current passed by the first anode 15, due to variations of voltage applied to grid 17, bring about changes in the potential applied to the second grid 18.

The condenser C connects anode 16 with control grid 18. In setting up the arrangement the condenser is disconnected and the circuit is adjusted in known manner so that one triode section alone conducts when the voltage at the input terminals is less than one predetermined value and the other section alone conducts when that voltage is above another predetermined value, the change over being arranged to take place rapidly in order to secure a high gain. The potential divider 12 is so adjusted that when the voltage to be regulated is at the desired value the potentials of the control grids 17 and 18 are approximately equal and the current passed by the double valve is shared between the two anodes. Under these conditions a rise in voltage across terminals 22 will cause a corresponding increase in the potential of control grid 17 and this will result in an increase in current passed by anode 15 and a decrease in current passed by anode 16. This decrease in current in the anode 16 results in a decrease in the voltage drop across the resistance 14 and this decrease is arranged to control the voltage adjusting apparatus 3 in such a manner as to cause the voltage applied to the circuit to be reduced, thus correcting the rise in voltage across terminals 22. The preliminary adjustment being completed, the condenser is connected in circuit. This provides a differential negative feedback which gives the circuit a simple integral response to slow changes of time constant ACR where A represents the gain of the triode section to which the condenser is connected. This time constant may be made very much larger than that of the condenser and resistance alone.

For rapid changes in the voltage to be regulated this response of the circuit is entirely different from the response to slow changes, due to the combined effect of substantial differential negative feedback and cathode coupling between the two triode sections of the double triode valve. If the time constant CR is made large the negative feedback provided by C may be regarded as a voltage of feedback unity. The gain from cathode to anode of the triode section to which the condense ris connected is therefore unity, and since the two triode sections of the valve are cathode coupled, the total gain for the double valve is also unity. This total is arranged to be insufficient to cause instability of the system and this limited gain is insufficient for the desired accuracy of the control. Any rapid change in the voltage to be regulated is therefore partially corrected rapidly, the speed of correction being limited only by the speed of response of the regulator.

Summarizing, slow changes in the voltage to be regulated are amplified and passed, after integration, to the voltage adjusting apparatus and rapid changes are passed to the voltage adjusting apparatus unamplified and without delay. In operation, therefore, a rapid change is first subject to rapid partial correction, being followed by a complete correction to the desired accuracy at a rate sufficiently slow to ensure that there will be no hunting.

Having thus described my invention, what I claim is:

Voltage regulating apparatus comprising, in combination, electronic valve means connected across a substantially stable high tension supply and having a first anode, a first control grid, a second anode, a second control grid, at least one cathode and a common cathode resistor, whereby the sum of the currents in the two circuits associated with the two anodes tends to remain substantially constant; a first potential divider for applying a predetermined voltage to the second control grid; a second potential divider connected across the substantially stable high-tension supply; means for varying the predetermined voltage of the second control grid in accordance with the current flowing in the circuit of the first anode, the first control grid being supplied with a voltage representative of the voltage to be regulated and the voltage difference between the second anode and a tapping point on the second potential divider being fed to a control device to adjust the voltage to be regulated; a condenser connected between the second control grid and the second anode; and a resistance connected between the second control grid and the first potential divider.

References Cited in the file of this patent

UNITED STATES PATENTS

| | | |
|---|---|---|
| 2,330,638 | Stratton | Sept. 28, 1943 |
| 2,337,911 | Mayer et al. | Dec. 28, 1943 |
| 2,594,006 | Friend | Apr. 22, 1953 |
| 2,668,921 | Lash | Feb. 9, 1954 |